(12) United States Patent
Takahashi et al.

(10) Patent No.: US 11,717,965 B2
(45) Date of Patent: Aug. 8, 2023

(54) DETERMINATION OF ROBOT POSTURE

(71) Applicant: KABUSHIKI KAISHA YASKAWA DENKI, Kitakyushu (JP)

(72) Inventors: Makoto Takahashi, Fukuoka (JP); Wataru Watanabe, Fukuoka (JP); Yutaro Uchida, Fukuoka (JP); Ryo Kabutan, Fukuoka (JP)

(*) Notice: Subject to any disclaimer, the term of this patent is extended or adjusted under 35 U.S.C. 154(b) by 229 days.

(21) Appl. No.: 17/144,145

(22) Filed: Jan. 8, 2021

(65) Prior Publication Data
US 2022/0143829 A1 May 12, 2022

(30) Foreign Application Priority Data
Nov. 10, 2020 (JP) .................. 2020-187406

(51) Int. Cl.
*B25J 9/16* (2006.01)
(52) U.S. Cl.
CPC .................. *B25J 9/1664* (2013.01)
(58) Field of Classification Search
None
See application file for complete search history.

(56) References Cited

U.S. PATENT DOCUMENTS

| | | | |
|---|---|---|---|
| 2011/0301741 A1* | 12/2011 | Kayani | B25J 11/0055 901/30 |
| 2018/0194009 A1* | 7/2018 | Kojima | B25J 9/0018 |
| 2018/0281190 A1* | 10/2018 | Kakisaka | B25J 9/1661 |
| 2019/0240834 A1* | 8/2019 | Yi | G06Q 10/06315 |
| 2019/0314989 A1 | 10/2019 | Sokabe et al. | |
| 2020/0070340 A1* | 3/2020 | Kurtz | B25J 9/1679 |

FOREIGN PATENT DOCUMENTS

| | | |
|---|---|---|
| JP | 2020-049554 | 4/2020 |
| WO | WO-2017134735 A1 * | 8/2017 |
| WO | 2018/143003 | 8/2018 |

* cited by examiner

*Primary Examiner* — Abby Y Lin
*Assistant Examiner* — Dylan Brandon Mooney
(74) *Attorney, Agent, or Firm* — Soei Patent & Law Firm

(57) ABSTRACT

A program generation system according to an example includes circuitry configured to: set multiple kinds of candidate postures of a robot in a connection area between a work path that is a trajectory of the robot in a task and an air-cut path that is a trajectory of the robot connecting tasks; evaluate an operation program including the work path and the air-cut path while changing a posture of the robot in the connection area among the multiple kinds of candidate postures; determine one of the multiple kinds of candidate postures as the posture of the robot in the connection area based on an evaluation result in the evaluating; and generate the operation program.

20 Claims, 8 Drawing Sheets

DETERMINATION OF ROBOT POSTURE

CROSS-REFERENCE TO RELATED APPLICATIONS

This application is based upon and claims the benefit of priority from Japanese Patent Application No. 2020-187406, filed on Nov. 10, 2020, the entire contents of which are incorporated herein by reference.

BACKGROUND

Field

One aspect of the present disclosure relates to a program generation system, a robot system, a program generation method, and a generation program.

Description of the Related Art

WO 2018/143003 describes a robot path generation device that generates a robot path between a start point and an end point that are arbitrarily set, based on a result of a machine learning process based on a data set.

SUMMARY

A program generation system according to an aspect of the present disclosure includes circuitry configured to: set multiple kinds of candidate postures of a robot in a connection area between a work path that is a trajectory of the robot in a task and an air-cut path that is a trajectory of the robot connecting tasks; evaluate an operation program including the work path and the air-cut path while changing a posture of the robot in the connection area among the multiple kinds of candidate postures; determine one of the multiple kinds of candidate postures as the posture of the robot in the connection area based on an evaluation result in the evaluating; and generate the operation program.

A program generation method according to an aspect of the present disclosure is a program generation method executed by a program generation system comprising at least one processor, the method comprising: setting multiple kinds of candidate postures of a robot in a connection area between a work path that is a trajectory of the robot in a task and an air-cut path that is a trajectory of the robot connecting tasks; evaluating an operation program including the work path and the air-cut path while changing a posture of the robot in the connection area among the multiple kinds of candidate postures; determining one of the multiple kinds of candidate postures as the posture of the robot in the connection area based on an evaluation result in the evaluating; and generating the operation program.

A non-transitory computer-readable storage medium according to an aspect of the present disclosure stores a generation program for causing a computer to execute: setting multiple kinds of candidate postures of a robot in a connection area between a work path that is a trajectory of the robot in a task and an air-cut path that is a trajectory of the robot connecting tasks; evaluating an operation program including the work path and the air-cut path while changing a posture of the robot in the connection area among the multiple kinds of candidate postures; determining one of the multiple kinds of candidate postures as the posture of the robot in the connection area based on an evaluation result in the evaluating; and generating the operation program.

DETAILED DESCRIPTION

Figure 1:
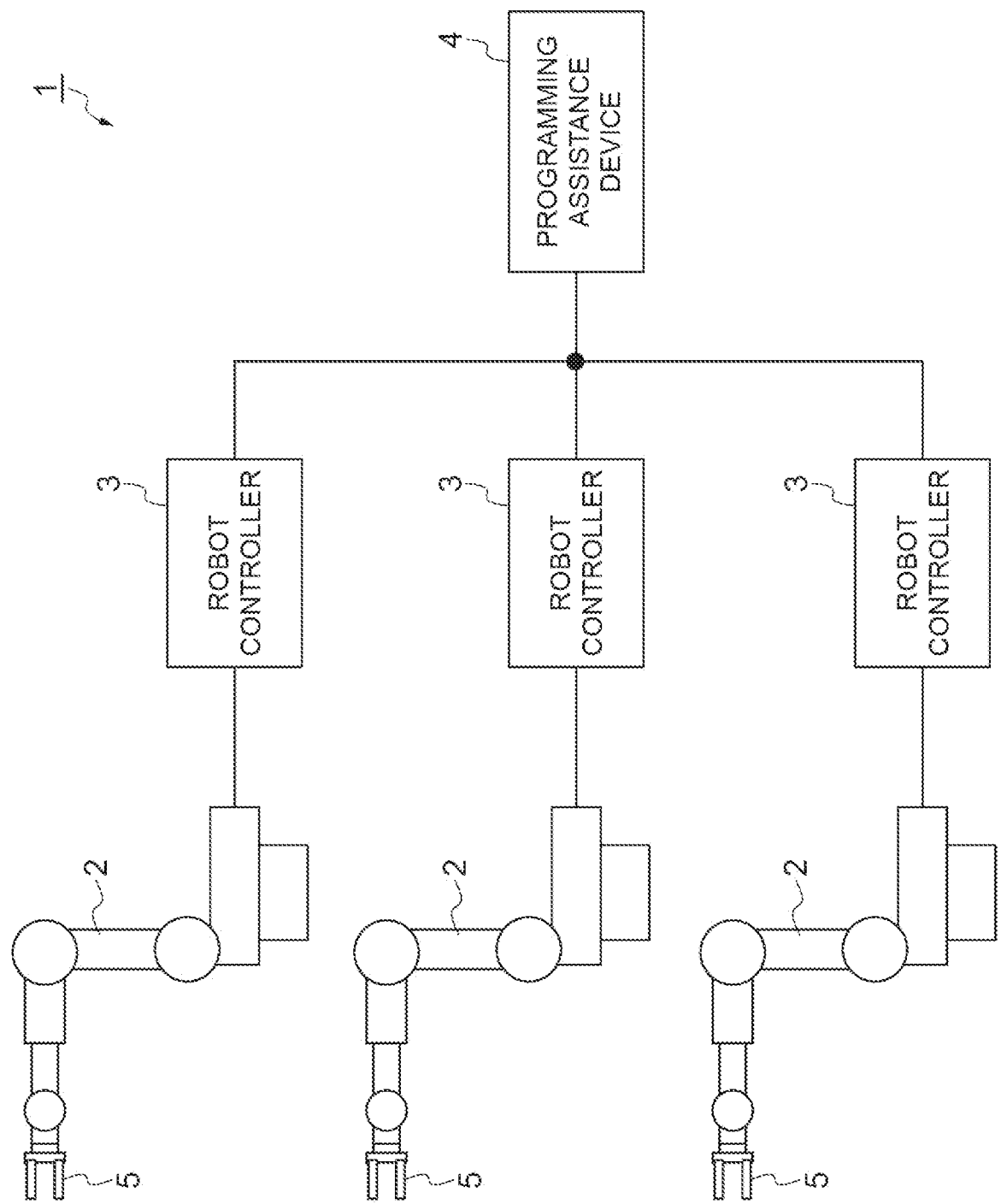
FIG. 1 is a diagram showing an example of the configuration of a robot system.

Hereinafter, examples of the present disclosure will be described in detail with reference to the accompanying drawings. In descriptions of the drawings, the same or equivalent element is denoted by the same reference numeral, and redundant description is omitted.

[Robot System]

The program generation system according to the present disclosure is applied to a programming assistance device 4 of a robot system 1. The robot system 1 is a system for automating various operations such as machining and assembly by causing a robot to execute an operation taught by an operator. FIG. 1 is a diagram showing an example of the configuration of the robot system 1. In one example, the robot system 1 includes one or more robots 2, one or more robot controllers 3 corresponding to the one or more robots 2, and the programming assistance device 4. FIG. 1 shows three robots 2 and three robot controllers 3, and further shows the configuration in which one robot 2 is connected to one robot controller 3. However, neither the number of devices nor the connection method is limited to the example shown in FIG. 1. For example, a plurality of robots 2 may be connected to one robot controller 3.

In one example, the robot 2 is a vertically articulated robot of multi-axis serial link type, and is configured to be able to execute various processes while holding a tool at a tip portion 5 thereof. The robot 2 can freely change the position and posture of the tip portion 5 within a predetermined range. The robot 2 may be a 6-axis vertically articulated robot or a 7-axis vertically articulated robot in which one redundant axis is added to 6 axes. In one example, the plurality of robots 2 are arranged such that any of the robots 2 can execute the same processing on the same workpiece arranged at the same position.

The robot controller 3 is a device for controlling the robot 2 in accordance with a previously generated operation program. In one example, the operation program includes data for controlling the robot 2, and includes, for example, a path indicating a trajectory of the robot 2. The trajectory of the robot 2 refers to a path of movement of the robot 2 or its component. For example, the trajectory of the robot 2 may be a trajectory of the tip portion 5. In one example, the robot controller 3 calculates a target joint angle value (a target angle value of each joint of the robot 2) for matching the position and posture of the tip portion 5 with the target value indicated by the operation program, and controls the robot 2 according to the target angle value.

The robot controller 3 controls the robot 2 to execute a series of processes. In the present disclosure, the series of processes is also referred to as "job." The process of the minimum unit constituting the job is called "task". Therefore, the job includes one or more tasks. The robot 2 may execute various tasks such as "take a component", "place a component", "fit a component (to a workpiece)", "take a standby posture". One task may include a work path that is a trajectory of the robot 2 in the task. In one example, the work path is set based on a user input when the task is generated. That is, the work path is set manually.

In one example, the robot 2 may be a self-propelled mobile robot. In this case, the robot 2 may move to a given position in a work space in accordance with the operation program before starting the processing. For example, the robot 2 can run by itself while avoiding other objects. The robot 2 may repeatedly execute the job (i.e., at least one task) indicated by the operation program, in an arrangement indicated by the operation program.

The operation program includes a path indicating a trajectory of the robot 2 connecting tasks. This path connects the end point of the work path in a preceding task and the start point of the work path in a following task. In the present disclosure, a path between tasks is also referred to as "air-cut path" to distinguish it from the work path. In one example, the air-cut path is automatically set by, for example, setting at least one teaching point other than the start point and the end point. The teaching point refers to a reference point set to define a path.

The programming assistance device 4 is a device that assists generation of an operation program. For example, the programming assistance device 4 generates, for each of one or more robots 2, the operation program indicating a job to be executed by the robot 2. In one example, the programming assistance device 4 evaluates at least some of the components of the job, such as an air-cut path, a posture of the robot 2 at a certain point in time. The programming assistance device 4 then generates the operation program based on the evaluation result. The programming assistance device 4 may execute simulation to perform the evaluation. Simulation is a process of virtually executing at least a part of the operation program. In more detail, the simulation means executing at least a part of the operation program on a computer in a simulated manner without actually operating the robot 2. In one example, the simulation is a process of virtually executing at least a part of the operation program on a virtual space in which the robot 2 and other objects are arranged. The other object is an object arranged around the robot 2, and may be, for example, another robot 2, a workpiece, or another manufacturing apparatus.

[Programming Assistance Device]

Figure 2:
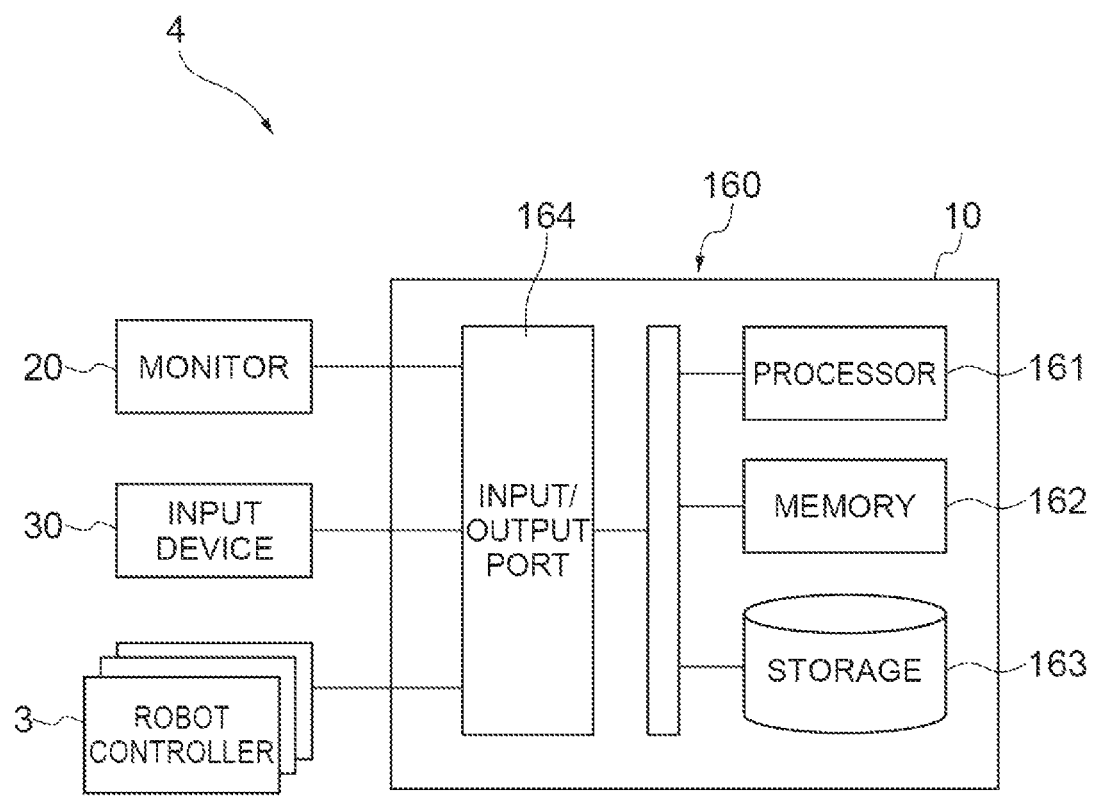
FIG. 2 is a diagram showing an example of a hardware configuration of a programming assistance device.

FIG. 2 is a diagram illustrating an example of a hardware configuration of the programming assistance device 4. The programming assistance device 4 includes a body 10, a monitor 20, and an input device 30.

The body 10 includes at least one computer. The body 10 includes circuitry 160, and the circuitry 160 includes at least one processor 161, a memory 162, a storage 163, and an input/output port 164. The storage 163 stores a program for configuring each functional module of the body 10. The storage 163 is a computer-readable recording medium such as a hard disk, a nonvolatile semiconductor memory, a magnetic disk, or an optical disk. The memory 162 temporarily stores a program loaded from the storage 163, an operation result of the processor 161, and the like. The processor 161 executes a program in cooperation with the memory 162 to configure each functional module. The input/output port 164 inputs and outputs an electrical signal from and to the monitor 20, the input device 30, and the robot controller 3 in response to an instruction from the processor 161.

The monitor 20 is a device for displaying information output from the body 10. The monitor 20 may be of any type as long as it can display graphics, and one example thereof is a liquid crystal panel. The input device 30 is a device for inputting information to the body 10. The input device 30 may be any device as long as desired information can be input, and some examples thereof include a keypad and a mouse.

The monitor 20 and the input device 30 may be integrated as a touch panel. For example, like a tablet computer, the body 10, the monitor 20, and the input device 30 may be integrated.

Figure 3:
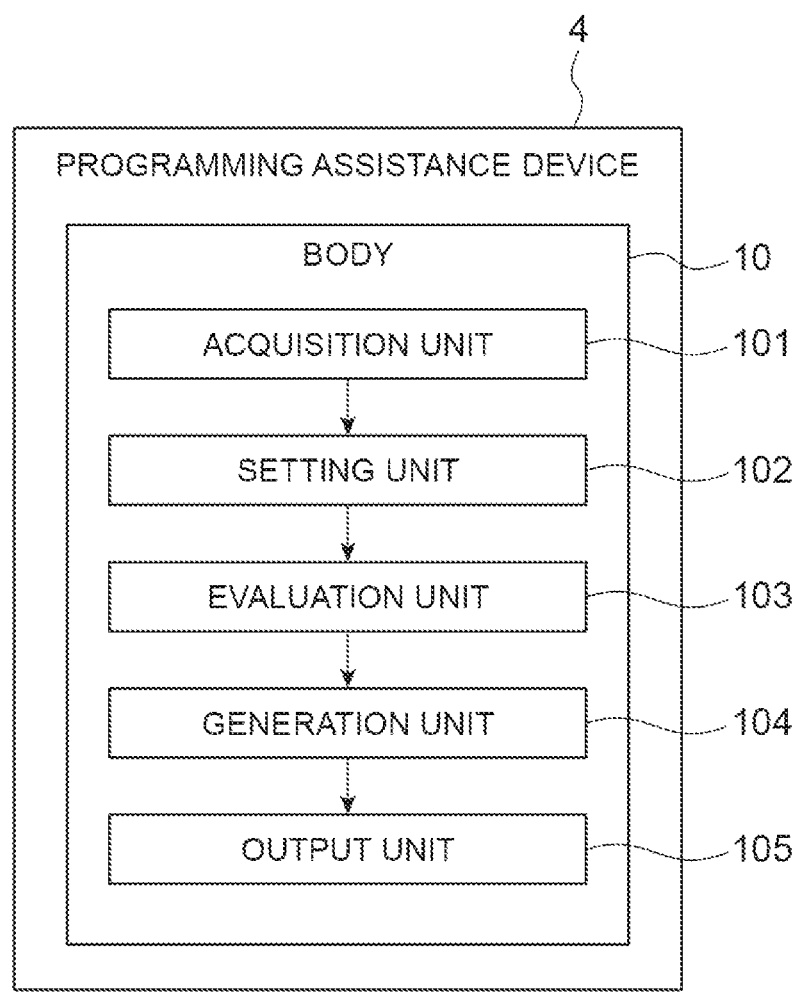
FIG. 3 is a diagram showing an example of a functional configuration of a programming assistance device.

FIG. 3 is a diagram showing an example of a functional configuration of the programming assistance device 4. In one example, the programming assistance device 4 includes an acquisition unit 101, a setting unit 102, an evaluation unit 103, a generation unit 104, and an output unit 105 as functional modules. The acquisition unit 101 is a functional module for acquiring data used to generate an operation program. The setting unit 102 is a functional module for setting multiple kinds of candidate postures of a robot in a connection area between a work path and an air-cut path. The candidate posture refers to a posture prepared as an option for finally determining the posture of the robot. The evaluation unit 103 is a functional module for evaluating the operation program including the work path and the air-cut path, while changing a posture of the robot in the connection area among the multiple kinds of candidate postures. The generation unit 104 is a functional module that determines one of the multiple kinds of candidate postures as the posture of the robot in the connection area based on the evaluation result by the evaluation unit 103, and generates the operation program. The operation program indicates the determined posture of the robot. The output unit 105 is a functional module for outputting the generated operation program.

The connection area refers to a limited physical range including a physical location where a work path and an air-cut path are connected. In some examples, the connection area is a range around a connection point between the work path and the air-cut path. There are two types of connection areas: approach area and retreat area. The approach area is a physical range including a position where the end point of a certain air-cut path is connected to the start point of a work path connected to that air-cut path. In some examples, the approach area is a connection area where the robot 2 approaches a task, in other words, a connection area where the robot 2 enters a subsequent work path from an air-cut path. The retreat area is a physical range including a position where the end point of a certain work path is connected to the start point of an air-cut path connected to that work path. In some examples, the retreat area is a connection area where robot 2 retreats from a task, in other words, a connection area where robot 2 enters a subsequent air-cut path from a work path. In the present disclosure, a candidate posture in the approach area is also referred to as "candidate approach posture", and a candidate posture in the retreat area is also referred to as "candidate retreat posture." In one example, the setting unit 102 sets multiple kinds of candidate approach postures in an approach area corresponding to a task and multiple kinds of candidate retreat postures in a retreat area corresponding to that task.

[Program Generation Method]

Figure 4:
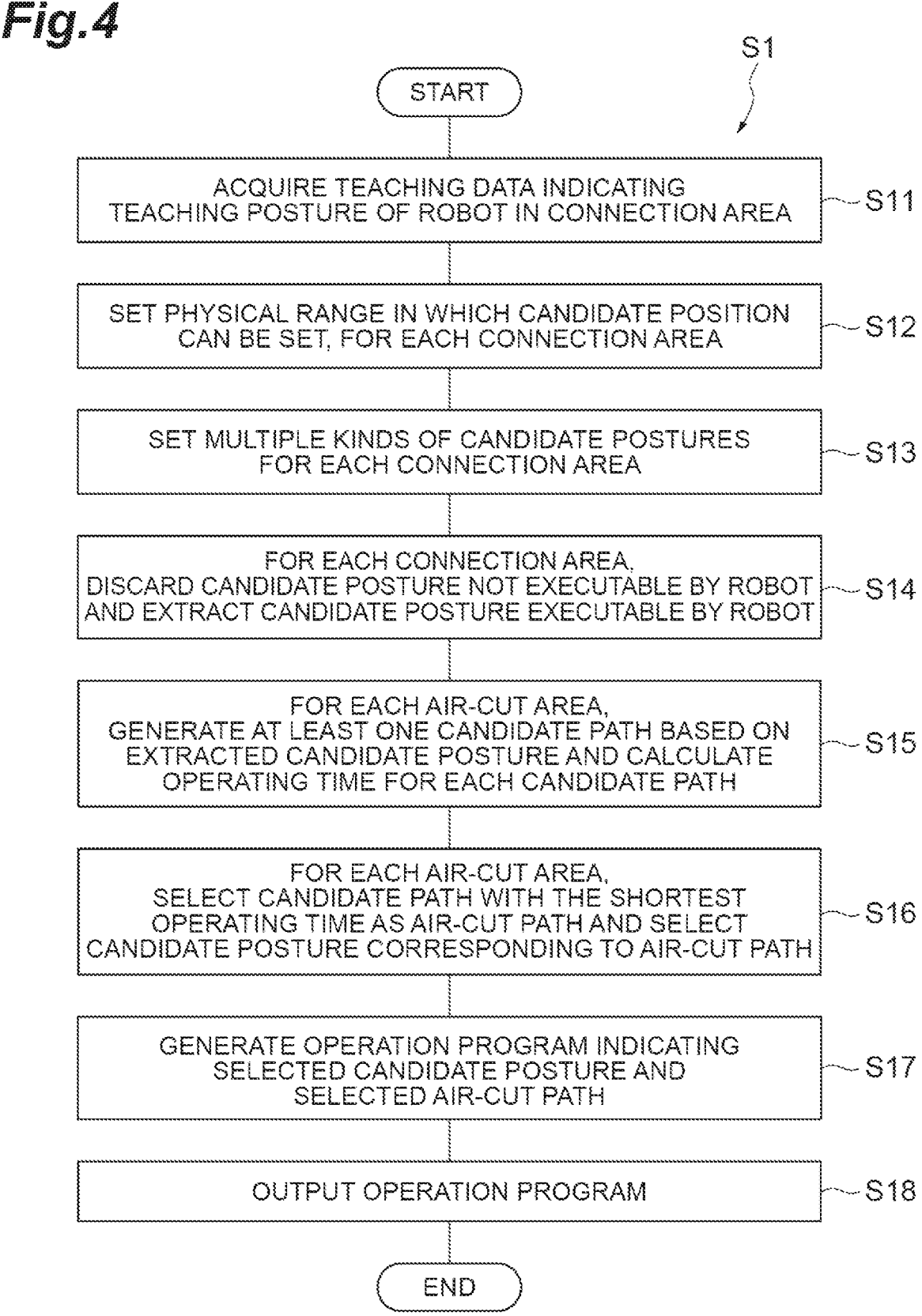
FIG. 4 is a flowchart showing an example of the operation of a programming assistance device.
Figure 5:
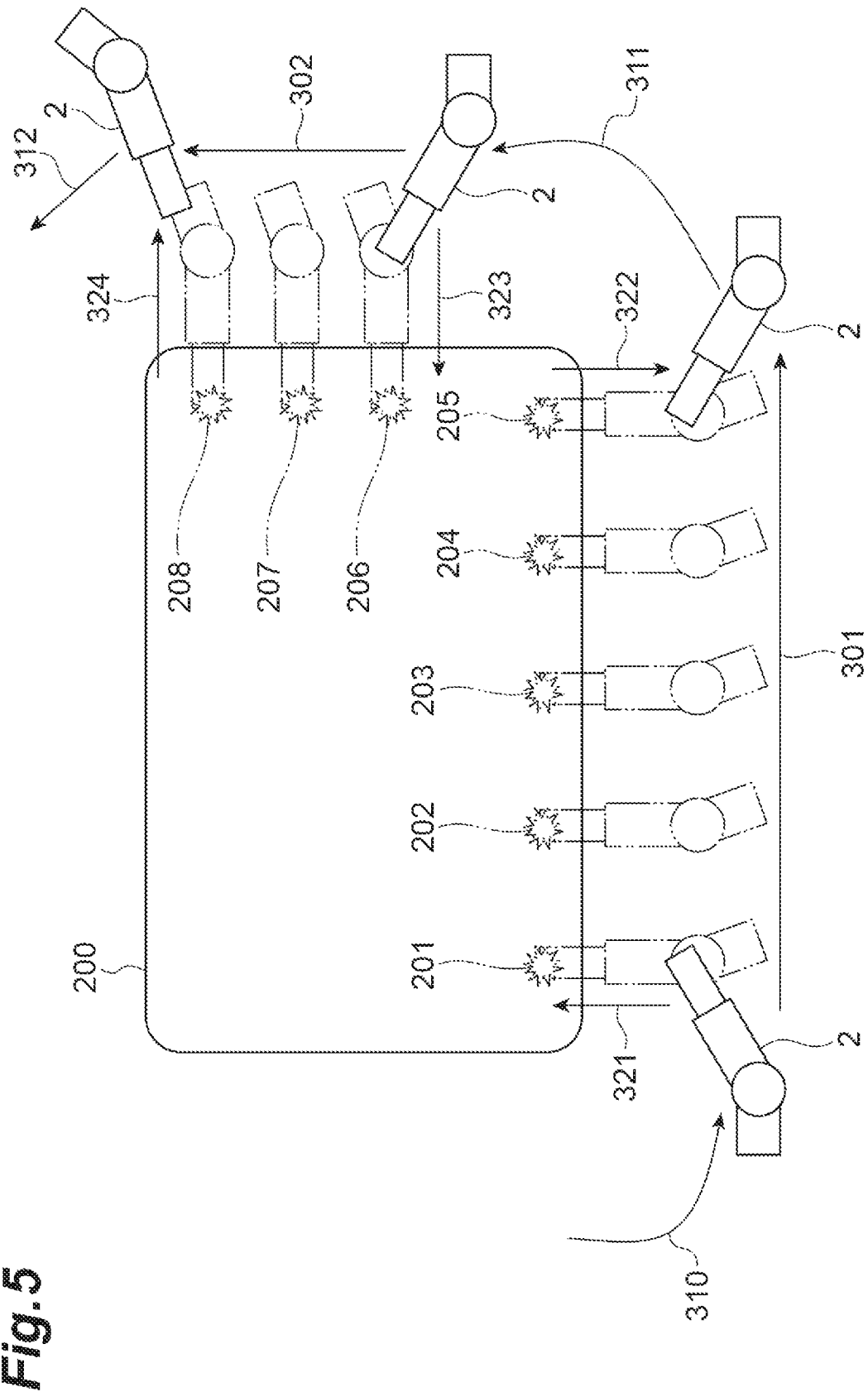
FIG. 5 is a diagram showing an example of processing for a workpiece by a robot.
Figure 6:
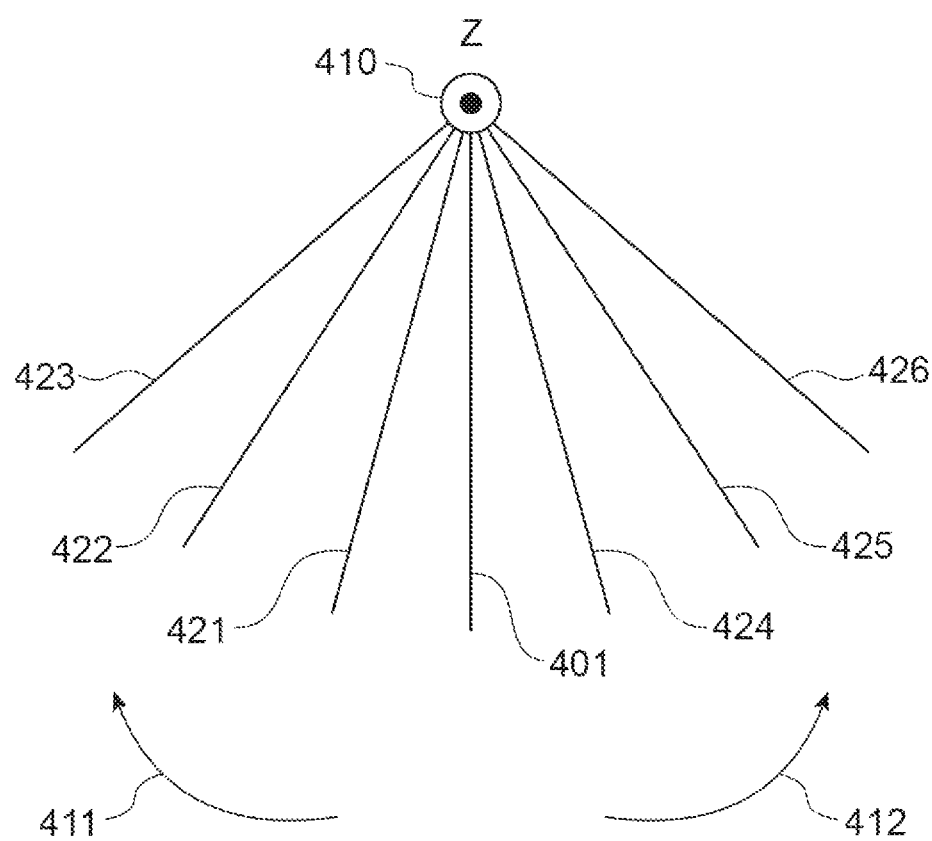
FIG. 6 is a diagram showing an example of setting of candidate postures.

As an example of the program generation method according to the present disclosure, an example of a series of processing procedures executed by the programming assistance device 4 will be described with reference to FIGS. 4 to 6. FIG. 4 is a flowchart showing an example of the operation of the programming assistance device 4 as a processing flow S1. That is, the programming assistance device 4 executes the processing flow S1. FIG. 5 is a diagram showing an example of processing for a workpiece by the robot 2. FIG. 6 is a diagram illustrating an example of setting of candidate postures.

In step S11, the acquisition unit 101 acquires teaching data used to generate an operation program. The teaching data is electronic data including information used to cause or instruct the robot 2 to execute a job, and indicates, for example, restrictions on the operation of the robot 2. Examples of the constraints include an arrangement of the robot 2, an order of a plurality of tasks, a correspondence between the robot 2 and the tasks, and an interlock. The interlock is a mechanism for executing a next operation only when a given condition is satisfied. The teaching data may include at least one of items set individually for each robot 2 and items set commonly for one or more robots 2. In one example, the teaching data indicates at least one work path and a teaching posture of the robot 2 in each of at least one connection area. The work path and the teaching posture are also an example of constraints. The teaching posture refers to a posture of the robot 2 set manually. In one example, a job includes a plurality of connection areas and, accordingly, the teaching data indicates a teaching posture of the robot 2 in each of the plurality of connection areas. Various approaches may be used to acquire teaching data. For example, the acquisition unit 101 may receive teaching data input by a user, may read teaching data from a given storage device based on a user input, or may receive teaching data transmitted from another computer.

An example of the teaching data will be described with reference to FIG. 5. In the example of FIG. 5, the robot 2 welds eight points on a to-be-processed surface of a workpiece 200 using a welding gun attached to the tip portion 5. The welding gun is an example of a tool. In FIG. 5, eight points are indicated as welding points 201 to 208. The robot 2 first processes the welding points 201 to 205, and then processes the welding points 206 to 208. In this example, the teaching data shows two work paths 301 and 302 for the welding. The work path 301 corresponds to a task of welding the welding points 201, 202, 203, 204, and 205 in this order. The work path 302 corresponds to a task of welding the welding points 206, 207, and 208 in this order. The programming assistance device 4 automatically generates an air-cut path 310 connecting to the start point of the work path 301, an air-cut path 311 connecting the work paths 301 and 302, and an air-cut path 312 connecting to the end point of the work path 302. A trajectory of the robot 2 passes through the air-cut path 310, the work path 301, the air-cut path 311, the work path 302, and the air-cut path 312 in this order. The teaching data indicates a teaching posture of the robot 2 in each of an approach area 321, a retreat area 322, an approach area 323, and a retreat area 324.

Returning to FIG. 4, in step S12, the setting unit 102 sets, as a candidate range, a physical range in which a candidate position can be set, for each connection area. In one example, the setting unit 102 sets the candidate range based on the teaching posture. The setting unit 102 may set a range within a given distance from the teaching posture as the candidate range. Alternatively, the setting unit 102 may set a rotation center with respect to the teaching posture, and set a range within a given angle around the rotation center as the candidate range. In the example of FIG. 5, the setting unit 102 sets candidate ranges for the approach area 321, the retreat area 322, the approach area 323, and the retreat area 324.

In step S13, the setting unit 102 sets multiple kinds of candidate postures for each connection area. The setting unit 102 sets the multiple kinds of candidate postures by adding at least one posture different from the teaching posture as a candidate posture. In one example, the teaching posture is one of the multiple kinds of candidate postures. For example, the setting unit 102 sets the multiple kinds of candidate postures within the candidate range. The setting unit 102 may add a candidate posture for each given step width based on the teaching posture in a certain connection area. That is, the setting unit 102 may discretely set a plurality of candidate postures. The step width indicates an interval between two adjacent candidate postures and is defined by, for example, a distance or an angle. The setting unit 102 may add two or more candidate postures so as to sandwich the teaching posture. In this case, at least one candidate posture is set in a first direction starting from the teaching posture, and at least one candidate posture is set in a second direction starting from the teaching posture and opposite to the first direction.

An example of setting the candidate postures will be described with reference to FIG. 6. In the example of FIG. 6, the setting unit 102 sets multiple kinds of candidate positions along one degree of freedom around the Z-axis of a coordinate system set to a tool (e.g., a welding gun) attached to the tip portion 5 of the robot 2. The Z-axis is an example of a reference axis 410 that intersects a to-be-processed surface of a workpiece processed by the robot 2. For example, the reference axis 410 is perpendicular to the to-be-processed surface of the workpiece. In this example, the setting unit 102 adds candidate postures 421 to 426 in response to an acquired teaching posture 401 to set a total of seven candidate postures. In FIG. 6, individual candidate postures are schematically indicated with solid lines. The setting unit 102 adds the candidate postures 421, 422, and 423 for each given step width (for example, 15°) from the teaching posture 401 toward a first direction (clockwise direction) 411. Further, the setting unit 102 adds the candidate postures 424, 425, and 426 for each given step width (for example, 15°) from the teaching posture 401 toward a second direction (counterclockwise direction) 412. The candidate postures 423, 426 may be located at or inside an outer edge of the candidate range. The teaching posture 401 is sandwiched between the candidate postures 421 to 423 and the candidate postures 424 to 426.

Returning to FIG. 4, in step S14, the setting unit 102 discards a candidate posture not executable by the robot 2 and extracts a candidate posture executable by the robot 2, for each connection area. In the present disclosure, the "posture not executable by a robot" refers to a posture that cannot be taken by the robot or a posture that is an obstacle in the operation of the robot. The "posture executable by a robot" refers to a posture that can be taken by the robot and is not an obstacle in the operation of the robot. In one example, the setting unit 102 determines, for each candidate posture added, whether the robot 2 is able to execute a candidate posture. The setting unit 102 discards a candidate posture when determining that the robot 2 cannot execute the candidate posture, and retains a candidate posture when determining that the robot 2 can execute the candidate posture. The setting unit 102 extracts a candidate posture that can be executed by the robot. The programming assistance device 4 executes the subsequent processing on the extracted candidate posture, without executing the subsequent processing on the discarded candidate posture.

In one example, the posture not executable by the robot 2 is a posture that cannot be executed or taken by the robot 2, and the posture executable by the robot 2 is a posture that can be executed or taken by the robot 2. In one example, the setting unit 102 refers to given specification data indicating a structure, a range of motion, etc. of the robot 2 to determine, for each candidate posture added, whether the robot 2 can execute the posture. In the present disclosure, this determination is also referred to as "single posture determination."

Alternatively, the posture not executable by the robot 2 is a posture in which the robot 2 interferes with another object, and the posture executable by the robot 2 is a posture in which the interference does not occur. In the present disclosure, the interference refers to contact or collision between objects, and in some examples, refers to contact or collision of the robot 2 with another object. In one example, the setting unit 102 determines, for each candidate posture added, whether the robot 2 interferes with another object. The setting unit 102 compares a physical range of the robot 2 taking the candidate posture with a physical range of another object to determine whether the two physical ranges overlap. This overlap means the interference. In the present disclosure, this determination is also referred to as "interference determination."

Alternatively, the posture not executable by the robot 2 is a posture having no continuity with previous and subsequent postures of the robot 2, and the posture executable by the robot 2 is a posture in which the continuity is maintained. The continuity of posture means that the posture of the robot 2 can transition from one state to the next state. The non-continuous posture is a posture that cannot transition between at least one of a previous posture and a subsequent posture. In other words, the posture without continuity is a singular point. In one example, the setting unit 102 refers to given specification data of the robot 2 and determines whether or not the robot 2 can execute a series of operations including the candidate posture and the previous and subsequent postures, for each added candidate posture. In the present disclosure, this determination is also referred to as "continuity determination."

The setting unit 102 may discard or extract the candidate posture using any combination of two or more selected from the single posture determination, the interference determination, and the continuity determination. As an example, it is assumed that all of the single posture determination, the interference determination, and the continuity determination are used. In this case, the setting unit 102 discards a posture that cannot be executed by the robot 2, a posture in which interference occurs between the robot 2 and another object, and a posture having no continuity with previous and subsequent postures. Then, the setting unit 102 extracts a candidate posture that can be executed by the robot 2, does not cause interference, and maintains continuity with previous and subsequent postures of the robot 2.

In step S15, the evaluation unit 103 automatically generates at least one candidate path based on the extracted candidate postures and calculates an operating time of the robot 2 for each candidate path, for each air-cut area. In the present disclosure, the air-cut area refers to a physical range in which an air-cut path is set. The candidate path is a path that is a candidate for the air-cut path. In one example, the evaluation unit 103 generates individual candidate paths so as to avoid interference between the robot 2 and other objects. For example, in order to generate one candidate path, the evaluation unit 103 generates one or more via points for avoiding interference of the robot 2 with another object, between the end point of the work path in a preceding task and the start point of the work path in a subsequent task. Then, the evaluation unit 103 generates a candidate path so as to sequentially pass through the one or more via points. In order to generate one candidate path, the estimation unit 103 may repeatedly execute a series of processes including setting of one or more via points and confirmation of avoidance of interference. Details of such a generation method are described in, for example, JP 4103057 B.

As an example, processing in an air-cut area between the end point of a first work path and the start point of a second work path will be described. It is assumed that m candidate retreat postures are extracted in the retreat area corresponding to the end point of the first work path, and n candidate approach postures are extracted in the approach area corresponding to the start point of the second work path. In this case, the evaluation unit 103 may automatically generate m×n candidate paths. The estimation unit 103 calculates an operating time of the robot 2 for each candidate path. The operating time is a time required for the robot 2 to perform a given operation. The operating time for the candidate path is a time required for the robot 2 to travel from the start point to the end point of the candidate path. The estimation unit 103 may acquire a travel time of the robot 2 on the shortest distance from the end point of the first work path to the start point of the second work path (that is, on the straight line connecting the two points) as the shortest time, and calculate an increment from the shortest time as the operating time. Alternatively, the evaluation unit 103 may calculate a required time of the robot 2 in the candidate path as the operating time. The estimation unit 103 may execute simulation to estimate the operating time of each candidate path. That is, the evaluation unit 103 may repeatedly execute the operation program virtually on a virtual space while changing the posture of the robot 2 in the connection area among the multiple kinds of candidate postures, and evaluate the operation program. Alternatively, the evaluation unit 103 may calculate, for each candidate path, the operating time using a function based on the length of the candidate path and an operation speed of the robot 2.

For example, it is assumed that candidate retreat postures $Pr_1$ and $Pr_2$ are extracted from a retreat area Zr corresponding to the end point of the first work path, and candidate approach postures $Pa_1$ and $Pa_2$ are extracted from an approach area Za corresponding to the start point of the second work path. In this case, the evaluation unit 103 generates a candidate path $R_1$ connecting the candidate retreat posture $Pr_1$ and the candidate approach posture $Pa_1$, a candidate path $R_2$ connecting the candidate retreat posture $Pr_1$ and the candidate approach posture $Pa_2$, a candidate path $R_3$ connecting the candidate retreat posture $Pr_2$ and the candidate approach posture $Pa_1$, and a candidate path $R_4$ connecting the candidate retreat posture $Pr_2$ and the candidate approach posture $Pa_2$. The evaluation unit 103 calculates an operating time of the robot 2 for each of the candidate paths $R_1$, $R_2$, $R_3$, and $R_4$. This process is a process of evaluating the operation program while changing the posture of the robot 2 in the retreat area Zr among the two candidate postures and changing the posture of the robot 2 in the approach area Za among the two candidate postures.

As shown in the step S15, the evaluation unit 103 may calculate the operating time of the robot 2, as an example of evaluation of the operation program. The candidate posture extracted in step S14 is a candidate posture executable by the robot 2. Therefore, the step S15 is an example of a process of evaluating the operation program while changing a posture of the robot 2 in the connection area among the multiple kinds of candidate postures executable by the robot 2. The evaluation unit 103 may evaluate the operation program for a plurality of combinations of the multiple kinds of candidate approach postures and the multiple kinds of candidate retreat postures. The candidate path is an example of the combination of the candidate approach posture and the candidate retreat posture. The process of calculating the operating time of the robot 2 for each of the plurality of candidate paths is an example of evaluating the operation program for the plurality of combinations of the multiple kinds of candidate approach postures and the multiple kinds of candidate retreat postures.

In one example, the evaluation unit 103 may calculate the operating time for each of an operation of moving from a candidate approach posture to a posture of starting a task and an operation of moving from a posture of finishing a task to a candidate retreat posture. In the present disclosure, the operation of moving from the candidate approach posture to the posture of starting the task is also referred to as "approach operation". In addition, the operation of moving from the posture of finishing the task to the candidate retreat posture is also referred to as "retreat operation". In one example, the evaluation unit 103 may calculate a time from the start of the retreat operation corresponding to the start point of the candidate path to the end of an approach operation corresponding to the end point of the candidate path, as an operating time of the robot 2 in the candidate path. Even if a time of at least one of the approach operation and the retreat operation is extended, it can be said that the approach posture and the retreat posture corresponding to the candidate path are efficient postures if the operating time of the candidate path as a whole is shortened.

In step S16, the generation unit 104 selects a candidate path with the shortest operating time as an air-cut path and selects a candidate posture corresponding to the air-cut path, for each air-cut area. The estimation unit 103 selects, for each air-cut area, a combination of one candidate retreat posture corresponding to the start point of the air-cut path having the shortest operating time and one candidate approach posture corresponding to the end point of the air-cut path, as a posture of the robot 2. This process is an example of determining one of the multiple kinds of candidate postures as a posture of the robot 2 in the connection area, based on the operating time of the robot 2.

In step S17, the generation unit 104 generates an operation program indicating the selected one or more candidate postures and the selected one or more air-cut paths. For example, it is assumed that an operating time of the robot 2 is the shortest in the candidate path $R_3$ among the candidate paths $R_1$ to $R_4$. In this case, the generation unit 104 selects the candidate path $R_3$ as an air-cut path, and selects the candidate retreat posture $Pr_2$ and the candidate approach posture $Pa_1$ corresponding to the start point and the end point of the candidate path $R_3$. The generation unit 104 then generates an operation program indicating the candidate retreat posture $Pr_2$, the candidate approach posture $Pa_1$, and the candidate path $R_3$. If this operation program is executed, the robot 2 takes the posture $Pr_2$ in the retreat area Zr, then passes through the air-cut path $R_3$, and then takes the posture $Pa_1$ in the approach area Za.

In step S18, the output unit 105 outputs the generated operation program. For example, the output unit 105 may store the operation program in a recording medium such as the storage 163 or may transmit the operation program to another computer such as the robot controller 3. Alternatively, the output unit 105 may display the operation program on the monitor 20 in the form of text, a moving image or a still image by computer graphics (CG), or the like. The programming assistance device 4 may execute additional processing such as further interference check on the output operation program.

In one example, the output unit 105 outputs, to the robot controller 3, an operation program that has been confirmed by simulation that interference does not occur, and the robot controller 3 operates the robot 2 based on the operation program. Since the robot 2 that operates based on the operation program is obtained by the processing flow S1, the processing flow S1 is an example of the program generation method according to the present disclosure and is also an example of a method for manufacturing a robot.

Figure 7:
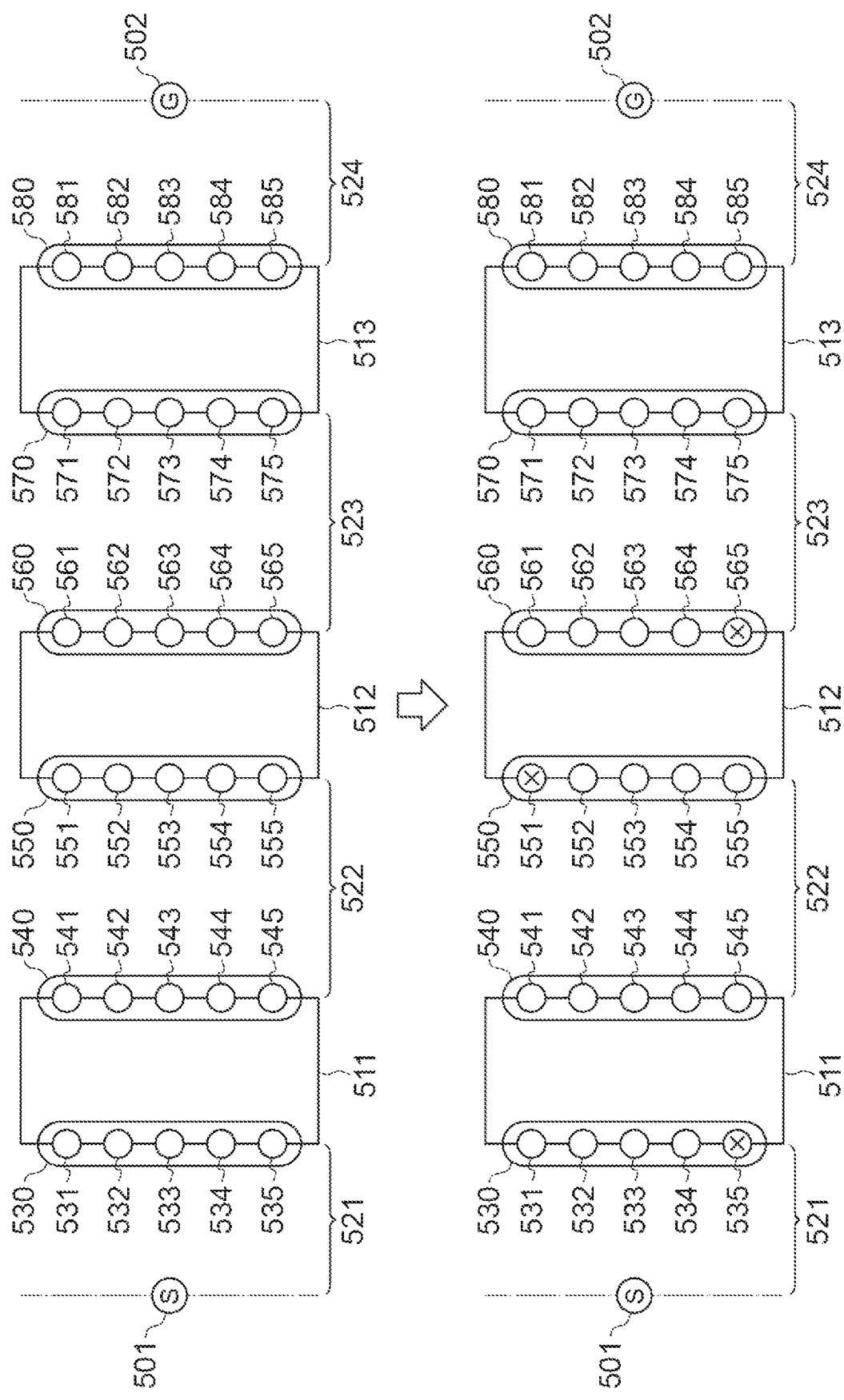
FIG. 7 is a diagram showing an example of generation of an operation program.
Figure 8:
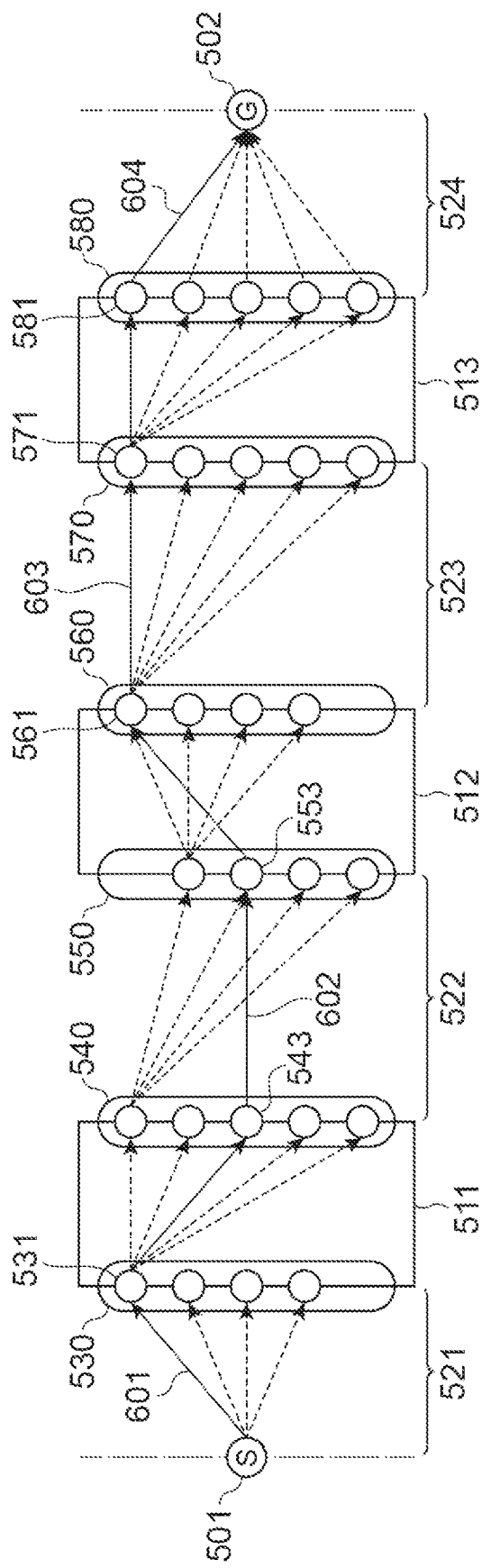
FIG. 8 is a diagram showing another example of generation of an operation program.

FIGS. 7 and 8 are diagrams showing examples of generation of an operation program. In this example, the acquisition unit 101 acquires teaching data for causing the robot 2 taking an initial posture 501 to execute tasks 511, 512, and 513 in this order and then take an end posture 502. In one example, the initial posture 501, the tasks 511 to 513, and the end posture 502 are manually defined. Each of tasks 511 to 513 may include a work path. In this example, programming assistance device 4 sets an air-cut path in each of air-cut area 521 between the initial posture 501 and the task 511, an air-cut area 522 between the tasks 511 and 512, an air-cut area 523 between the tasks 512 and 513, and an air-cut area 524 between the task 513 and the end posture 502.

As shown in FIG. 7, the setting unit 102 sets five candidate approach postures 531 to 535 for an approach area 530 corresponding to the start point of the task 511, and sets five candidate retreat postures 541 to 545 for a retreat area 540 corresponding to the end point of the task 511. Further, the setting unit 102 sets five candidate approach postures 551 to 555 for an approach area 550 corresponding to the start point of the task 512, and sets five candidate retreat postures 561 to 565 for a retreat area 560 corresponding to the end point of the task 512. Further, the setting unit 102 sets five candidate approach postures 571 to 575 for an approach area 570 corresponding to the start point of the task 513, and sets five candidate retreat postures 581 to 585 for a retreat area 580 corresponding to the end point of the task 513. In this example, the number of candidate postures is the same in each connection area, but the number may vary among at least some of a plurality of connection areas. The setting unit 102 discards a candidate posture that cannot be executed by the robot 2 and extracts a candidate posture that can be executed by the robot 2, for each connection area. In the example of FIG. 7, the setting unit 102 discards the candidate approach posture 535 in the approach area 530, the candidate approach posture 551 in the approach area 550, and the candidate retreat posture 565 in the retreat area 560, and extracts the remaining candidate postures.

As shown in FIG. 8, the evaluation unit 103 automatically generates at least one candidate path based on the extracted candidate postures, for each of the air-cut areas 521 to 524. FIG. 8 depicts combinations of two selectable postures adjacent to each other along a job direction, with dashed arrows. Each dashed arrow in the air-cut area schematically indicates a candidate path (i.e., an option of the air-cut path). Each dashed arrow in the task indicates a combination of a selectable approach posture and a selectable retreat posture. In this example, the work paths are already defined by the teaching data. Since four candidate approach postures are extracted in the approach area 530, the evaluation unit 103 generates four candidate paths in the air-cut area 521. Since five candidate retreat postures are extracted in the retreat area 540 and four candidate approach postures are extracted in the approach area 550, the evaluation unit 103 generates twenty candidate paths in the air-cut area 522. Since four candidate retreat postures are extracted in the retreat area 560 and five candidate approach postures are extracted in the approach area 570, the evaluation unit 103 generates twenty candidate paths in the air-cut area 523. Since five candidate retreat postures are extracted in the retreat area 580, the evaluation unit 103 generates five candidate paths in the air-cut area 524.

In the example of FIG. 8, the evaluation unit 103 selects a candidate path 601 connecting the initial posture 501 and the candidate approach posture 531 as an air-cut path in the air-cut area 521. In response to this selection, generation unit 104 determines the candidate approach posture 531 as a posture of robot 2 in the approach area 530. For the air-cut area 522, the evaluation unit 103 selects a candidate path 602 connecting the candidate retreat posture 543 and the candidate approach posture 553 as an air-cut path. Therefore, the generation unit 104 determines the candidate retreat posture 543 as a posture of the robot 2 in the retreat area 540, and determines the candidate approach posture 553 as a posture of the robot 2 in the approach area 550. For the air-cut area 523, the evaluation unit 103 selects a candidate path 603 connecting the candidate retreat posture 561 and the candidate approach posture 571 as an air-cut path. Therefore, the generation unit 104 determines the candidate retreat posture 561 as a posture of the robot 2 in the retreat area 560, and determines the candidate approach posture 571 as a posture of the robot 2 in the approach area 570. For the air-cut area 524, the evaluation unit 103 selects a candidate path 604 connecting the candidate retreat posture 581 and the end posture 502 as an air-cut path. In response to this selection, generation unit 104 determines candidate retreat posture 581 as a posture of robot 2 in the retreat area 580.

In the example of FIG. 8, the generation unit 104 generates an operation program indicating the air-cut path 601, the posture 531 in the approach area 530, the posture 543 in the retreat area 540, the air-cut path 602, the posture 553 in the approach area 550, the posture 561 in the retreat area 560, the air-cut path 603, the posture 571 in the approach area 570, the posture 581 in the retreat area 580, and the air-cut path 604.

As shown in FIGS. 7 and 8, the setting unit 102 sets multiple kinds of candidate postures for each of the plurality of connection areas (the approach areas 530, 550, and 570, and the retreat areas 540, 560, and 580) corresponding to the plurality of tasks 511 to 513. The evaluation unit 103 evaluates the operation program while changing the posture of the robot 2 in the multiple kinds of candidate postures for each of the plurality of connection areas. For example, in the approach area 530, the evaluation unit 103 evaluates the operation program while changing the posture of the robot 2 among the candidate approach postures 531 to 534. The generation unit 104 determines one of the multiple kinds of candidate postures as the posture of the robot 2 for each of the plurality of connection areas.

[Program]

Each functional module of the programming assistance device 4 is implemented by reading a generation program on the processor 161 or the memory 162 and causing the processor 161 to execute the program. The generation program includes codes for implementing each functional module of the programming assistance device 4. The processor 161 operates the input/output port 164 according to the generation program, and executes reading and writing of data in the memory 162 or the storage 163. By such processing, each functional module of the programming assistance device 4 is realized.

The generation program may be provided after being fixedly recorded on a non-transitory recording medium such as a CD-ROM, a DVD-ROM, or a semiconductor memory. Alternatively, the generation program may be provided via a communication network as a data signal superimposed on a carrier wave.

As described above, a program generation system according to an aspect of the present disclosure includes circuitry configured to: set multiple kinds of candidate postures of a robot in a connection area between a work path that is a trajectory of the robot in a task and an air-cut path that is a trajectory of the robot connecting tasks; evaluate an operation program including the work path and the air-cut path while changing a posture of the robot in the connection area among the multiple kinds of candidate postures; determine one of the multiple kinds of candidate postures as the posture of the robot in the connection area based on an evaluation result in the evaluating; and generate the operation program.

A program generation method according to an aspect of the present disclosure is a program generation method executed by a program generation system comprising at least one processor, the method comprising: setting multiple kinds of candidate postures of a robot in a connection area between a work path that is a trajectory of the robot in a task and an air-cut path that is a trajectory of the robot connecting tasks; evaluating an operation program including the work path and the air-cut path while changing a posture of the robot in the connection area among the multiple kinds of candidate postures; determining one of the multiple kinds of candidate postures as the posture of the robot in the connection area based on an evaluation result in the evaluating; and generating the operation program.

A non-transitory computer-readable storage medium according to an aspect of the present disclosure stores a generation program for causing a computer to execute: setting multiple kinds of candidate postures of a robot in a connection area between a work path that is a trajectory of the robot in a task and an air-cut path that is a trajectory of the robot connecting tasks; evaluating an operation program including the work path and the air-cut path while changing a posture of the robot in the connection area among the multiple kinds of candidate postures; determining one of the multiple kinds of candidate postures as the posture of the robot in the connection area based on an evaluation result in the evaluating; and generating the operation program.

A posture of the robot in the connection area connecting the work path and the air-cut path affects an operation efficiency of the robot. In the any one of the above aspects, the multiple kinds of candidate postures are set for the connection area, the operation program is evaluated for each candidate posture, and one posture is determined based on the evaluation result. By automatically determining the posture of the robot in the connection area in this manner, the robot control planning can be appropriately executed.

In the program generation system according to another aspect, the circuitry may be further configured to: add at least one candidate posture in order to set the multiple kinds of candidate postures; and determine, for each of the at least one candidate posture, whether the robot is able to execute the candidate posture. The multiple kinds of candidate postures that are set may include the candidate posture executable by the robot. The execution time required for evaluating the operation program is shortened by evaluating the operation program with respect only to a posture executable by the robot. The posture of the robot can therefore be determined in a shorter time.

In the program generation system according to another aspect, the circuitry may be further configured to discard one or more of the multiple kinds of candidate postures that are not executable by the robot.

In the program generation system according to another aspect, the circuitry may be further configured to discard one or more of the multiple kinds of candidate postures in which the robot interferes with another object, and the candidate posture executable by the robot may include at least one of the multiple kinds of candidate postures in which the robot does not interfere with the other object.

In the program generation system according to another aspect, the circuitry may be further configured to discard one or more of the multiple kinds of candidate postures having no continuity with previous and subsequent postures of the robot, and the candidate posture executable by the robot may include at least one of the multiple kinds of candidate postures in which the continuity is maintained.

In the program generation system according to another aspect, the circuitry may be further configured to: set the multiple kinds of candidate postures for each of a plurality of the connection areas corresponding to a plurality of the tasks; evaluate the operation program, while changing the posture of the robot in the connection area among the multiple kinds of candidate postures for each of the plurality of connection areas; and determine, for each of the plurality of connection areas, one of the multiple kinds of candidate postures as the posture of the robot in the connection area. In this case, it is possible to appropriately execute planning of robot control including a plurality of work paths and a plurality of air-cut paths. In one example, since the path search is executed also in a candidate posture other than the teaching posture, not only the probability of finding an optimal posture but also the probability of finding an efficient path can be increased. For example, even in a section where it is difficult to find an optimal air-cut path only based on the teaching posture, it is possible to find an efficient air-cut path by a path search based on a plurality of candidate postures.

In the program generation system according to another aspect, the circuitry may be further configured to: set multiple kinds of candidate approach postures of the robot in an approach area that is the connection area where the robot approaches the task, and multiple kinds of candidate retreat postures of the robot in a retreat area that is the connection area where the robot retreats from the task, as the multiple kinds of candidate postures; and determine a combination of an approach posture selected from the multiple kinds of candidate approach postures and a retreat posture selected from the multiple kinds of candidate retreat postures, as the posture of the robot. In this case, it is possible to appropriately set a posture of the robot at each of the start and end of one task.

In the program generation system according to another aspect, the circuitry may be further configured to evaluate the operation program for a plurality of combinations of the multiple kinds of candidate approach postures and the multiple kinds of candidate retreat postures. Since one combination is determined after a plurality of combinations of the approach posture and the retreat posture are evaluated, the robot control planning can be executed appropriately in consideration of a series of operations of the robot.

In the program generation system according to another aspect, the circuitry may be further configured to determine one of the multiple kinds of candidate postures as the posture of the robot in the connection area based on an operating time of the robot. With this processing, the robot control planning can be executed appropriately in consideration of the robot operating time.

In the program generation system according to another aspect, the circuitry may be further configured to: set the multiple kinds of candidate postures for each of a plurality of the connection areas corresponding to a plurality of the tasks including a first task and a second task; in an air-cut area that is a physical range in which the air-cut path connecting the first task and the second task is set, set a plurality of candidate paths that are candidates of the air-cut path, based on the multiple kinds of candidate postures corresponding to the air-cut area; and calculate the operating time of the robot for each of the plurality of candidate paths.

In the program generation system according to another aspect, the plurality of connection areas may include a retreat area that is the connection area where the robot retreats from the first task and an approach area that is the connection area in which the robot approaches the second task. The circuitry may be further configured to: set multiple kinds of candidate retreat postures of the robot in the retreat area and multiple kinds of candidate approach postures of the robot in the approach area as the multiple kinds of candidate postures; and for each of the plurality of candidate paths, calculate, as the operating time of the robot in the candidate path, a time from a start of a retreat operation that is an operation of moving from a posture of finishing the first task to the candidate retreat posture, to an end of an approach operation that is an operation of moving from the candidate approach posture to a posture of starting the second task.

In the program generation system according to another aspect, the circuitry may be further configured to select a candidate path having a shortest operating time among the plurality of candidate paths as the air-cut path, and select the candidate path corresponding to the air-cut path.

In the program generation system according to another aspect, the circuitry may be further configured to repeatedly execute the operation program virtually on a virtual space while changing the posture of the robot in the connection area among the multiple kinds of candidate postures, and evaluate the operation program. By evaluating the operation program based on so-called simulation, it is possible to appropriately execute the planning of robot control while assuming an actual operation of the robot.

In the program generation system according to another aspect, the circuitry may be further configured to: acquire a teaching posture of the robot in the connection area; and set the multiple kinds of candidate postures within a physical range based on the teaching posture. Since the multiple kinds of candidate postures are set in consideration of the teaching posture defined typically by the user, it is possible to prepare a candidate posture that meets the user's intention and is expected to increase the efficiency of the robot operation.

In the program generation system according to another aspect, the circuitry may be further configured to add the candidate posture for each given step width based on the teaching posture in order to set the multiple kinds of candidate postures. By discretely adding the multiple kinds of candidate postures, it is possible to efficiently search a desired posture of the robot in the connection area.

In the program generation system according to another aspect, the circuitry may be further configured to add two or more of candidate postures so as to sandwich the teaching posture, in order to set the multiple kinds of candidate postures. By adding candidate postures to both sides of the teaching posture, it is possible to efficiently search a desired posture of the robot in the connection area.

In the program generation system according to another aspect, the circuitry may be further configured to set the multiple kinds of candidate postures along one degree of freedom around a reference axis intersecting with a to-be-processed surface of a workpiece processed by the robot. This approach allows the multiple kinds of candidate postures to be set without affecting the processing of a workpiece.

In the program generation system according to another aspect, the program generation system may further include the robot; and a robot controller operating the robot based on the generated operation program.

Additional Examples

The present disclosure has been described above in detail based on the examples. However, the present disclosure is not limited to the above examples. The present disclosure can be variously modified without departing from the gist thereof.

The program generation system may evaluate an operation program while changing a posture of a robot in a connection area among multiple kinds of candidate postures, without checking whether the robot can execute set candidate postures.

The functional configuration of the program generation system is not limited to the above examples. The program generation method according to the present disclosure may be executed using a functional configuration different from the above examples.

The hardware configuration of the program generation system is not limited to an example in which each functional module is implemented by executing a program. For example, at least a part of the functional modules described above may be configured by logic circuitry specialized for the function thereof, or may be configured by an application specific integrated circuit (ASIC) in which the logic circuitry is integrated.

A processing procedure of a method executed by at least one processor is not limited to the above examples. For example, some of the above-described steps (processes) may be omitted, or the steps may be executed in a different order. Further, two or more of the above-described steps may be combined, or a part of the steps may be modified or deleted. Alternatively, other steps may be executed in addition to the above steps.

In a case where the magnitude relationship between two numerical values is compared in a computer system or a computer, either of two criteria "greater than or equal to" and "greater than" may be used, and either of two criteria "less than or equal to" and "less than" may be used.

We claim all modifications and variations coming within the spirit and scope of the subject matter claimed herein.

Regarding the above embodiments, the following appendices are provided by way of further illustration.
(Appendix 1)
  A program generation system comprising:
  a setting unit configured to set multiple kinds of candidate postures of a robot in a connection area between a work path that is a trajectory of the robot in a task and an air-cut path that is a trajectory of the robot connecting tasks;
  an evaluation unit configured to evaluate an operation program including the work path and the air-cut path while changing a posture of the robot in the connection area among the multiple kinds of candidate postures; and
  a generation unit configured to determine one of the multiple kinds of candidate postures as the posture of the robot in the connection area based on an evaluation result by the evaluation unit, and generate the operation program.
(Appendix 2)
  The program generation system according to appendix 1, wherein
    the setting unit is further configured to determine, for each of the candidate postures added, whether the robot is able to execute the candidate posture, and discard the candidate posture not executable by the robot, and
    the evaluation unit is further configured to evaluate the operation program while changing the posture of the robot in the connection area among the multiple kinds of candidate postures executable by the robot.
(Appendix 3)
  The program generation system according to appendix 1 or 2, wherein
    the setting unit is further configured to set the multiple kinds of candidate postures for each of a plurality of the connection areas corresponding to a plurality of the tasks,
    the evaluation unit is further configured to evaluate the operation program, while changing the posture of the robot in the connection area among the multiple kinds of candidate postures for each of the plurality of connection areas, and
    the generation unit is further configured to determine, for each of the plurality of connection areas, one of the multiple kinds of candidate postures as the posture of the robot in the connection area.
(Appendix 4)
  The program generation system according to any one of appendices 1 to 3, wherein
    the setting unit is further configured to set multiple kinds of candidate approach postures of the robot in an approach area that is the connection area where the robot approaches the task, and multiple kinds of candidate retreat postures of the robot in a retreat area that is the connection area where the robot retreats from the task, as the multiple kinds of candidate postures, and
    the generation unit determines a combination of an approach posture and a retreat posture as the posture of the robot.
(Appendix 5)
  The program generation system according to appendix 4, wherein
    the evaluation unit is further configured to evaluate the operation program for a plurality of combinations of the multiple kinds of candidate approach postures and the multiple kinds of candidate retreat postures.
(Appendix 6)
  The program generation system according to any one of appendices 1 to 5, wherein
    the generation unit is further configured to determine one of the multiple kinds of candidate postures as the posture of the robot in the connection area based on an operating time of the robot.
(Appendix 7)
  The program generation system according to any one of appendices 1 to 6, wherein
    the evaluation unit is further configured to repeatedly execute the operation program virtually on a virtual space while changing the posture of the robot in the connection area among the multiple kinds of candidate postures, and evaluate the operation program.

(Appendix 8)

The program generation system according to any one of appendices 1 to 7, further comprising an acquisition unit configured to acquire a teaching posture of the robot in the connection area, wherein the setting unit is further configured to set the multiple kinds of candidate postures within a physical range based on the teaching posture.

(Appendix 9)

The program generation system according to appendix 8, wherein the setting unit is further configured to add the candidate posture for each given step width based on the teaching posture, as the setting of the multiple kinds of candidate postures.

(Appendix 10)

The program generation system according to appendix 8 or 9, wherein the setting unit is further configured to add two or more of candidate postures so as to sandwich the teaching posture, as the setting of the multiple kinds of candidate postures.

(Appendix 11)

The program generation system according to any one of appendices 1 to 10, wherein the setting unit is further configured to set the multiple kinds of candidate postures along one degree of freedom around a reference axis intersecting with a to-be-processed surface of a workpiece processed by the robot.

(Appendix 12)

A robot system comprising:

a robot;

the program generation system according to any one of appendices 1 to 10; and a robot controller operating the robot based on the generated operation program.

(Appendix 13)

A program generation method executed by a program generation system comprising at least one processor, the method comprising:

setting multiple kinds of candidate postures of a robot in a connection area between a work path that is a trajectory of the robot in a task and an air-cut path that is a trajectory of the robot connecting tasks;

evaluating an operation program including the work path and the air-cut path while changing a posture of the robot in the connection area among the multiple kinds of candidate postures; and determining one of the multiple kinds of candidate postures as the posture of the robot in the connection area based on an evaluation result in the evaluating, and generating the operation program.

(Appendix 14)

A generation program for causing a computer to execute:

setting multiple kinds of candidate postures of a robot in a connection area between a work path that is a trajectory of the robot in a task and an air-cut path that is a trajectory of the robot connecting tasks;

evaluating an operation program including the work path and the air-cut path while changing a posture of the robot in the connection area among the multiple kinds of candidate postures; and determining one of the multiple kinds of candidate postures as the posture of the robot in the connection area based on an evaluation result in the evaluating, and generating the operation program.

What is claimed is:

1. A program generation system comprising circuitry configured to:

set multiple kinds of candidate postures of a robot in a connection area corresponding to a physical location of a tip portion of the robot at a point of intersection that connects a work path that is a trajectory of the robot in a task with an air-cut path that is a trajectory of the robot connecting tasks;

evaluate an operation program including the work path and the air-cut path by changing a posture of the robot in the connection area, while maintaining the physical location of the tip portion of the robot at the point of intersection, among the multiple kinds of candidate postures;

determine one of the multiple kinds of candidate postures as the posture of the robot in the connection area based on an evaluation result in evaluating the operation program; and generate the operation program.

2. The program generation system according to claim 1, wherein the circuitry is further configured to:

add at least one candidate posture in order to set the multiple kinds of candidate postures; and determine, for each of the at least one candidate posture, whether the robot is able to execute the candidate posture, and wherein the multiple kinds of candidate postures that are set include the candidate posture executable by the robot.

3. The program generation system according to claim 2, wherein the circuitry is further configured to discard one or more of the multiple kinds of candidate postures that are not executable by the robot.

4. The program generation system according to claim 2, wherein the circuitry is further configured to discard one or more of the multiple kinds of candidate postures in which the robot interferes with another object, and wherein the candidate posture executable by the robot includes at least one of the multiple kinds of candidate postures in which the robot does not interfere with the other object.

5. The program generation system according to claim 2, wherein the circuitry is further configured to discard one or more of the multiple kinds of candidate postures having no continuity with previous and subsequent postures of the robot, and wherein the candidate posture executable by the robot includes at least one of the multiple kinds of candidate postures in which the continuity is maintained.

6. The program generation system according to claim 1, wherein the circuitry is further configured to:

set the multiple kinds of candidate postures for each of a plurality of the connection areas corresponding to a plurality of the tasks;

evaluate the operation program, while changing the posture of the robot in the connection area among the multiple kinds of candidate postures for each of the plurality of connection areas; and determine, for each of the plurality of connection areas, one of the multiple kinds of candidate postures as the posture of the robot in the connection area.

7. The program generation system according to claim 1, wherein the circuitry is further configured to:
set multiple kinds of candidate approach postures of the robot in an approach area that is the connection area where the robot approaches the task, and multiple kinds of candidate retreat postures of the robot in a retreat area that is the connection area where the robot retreats from the task, as the multiple kinds of candidate postures; and
determine a combination of an approach posture selected from the multiple kinds of candidate approach postures and a retreat posture selected from the multiple kinds of candidate retreat postures, as the posture of the robot.

8. The program generation system according to claim 7, wherein the circuitry is further configured to evaluate the operation program for a plurality of combinations of the multiple kinds of candidate approach postures and the multiple kinds of candidate retreat postures.

9. The program generation system according to claim 1, wherein the circuitry is further configured to determine one of the multiple kinds of candidate postures as the posture of the robot in the connection area based on an operating time of the robot.

10. The program generation system according to claim 9, wherein the circuitry is further configured to:
set the multiple kinds of candidate postures for each of a plurality of the connection areas corresponding to a plurality of the tasks including a first task and a second task;
in an air-cut area that is a physical range in which the air-cut path connecting the first task and the second task is set, set a plurality of candidate paths that are candidates of the air-cut path, based on the multiple kinds of candidate postures corresponding to the air-cut area; and
calculate the operating time of the robot for each of the plurality of candidate paths.

11. The program generation system according to claim 10, wherein the plurality of connection areas include a retreat area that is the connection area where the robot retreats from the first task and an approach area that is the connection area in which the robot approaches the second task, and
wherein the circuitry is further configured to:
set multiple kinds of candidate retreat postures of the robot in the retreat area and multiple kinds of candidate approach postures of the robot in the approach area as the multiple kinds of candidate postures; and
for each of the plurality of candidate paths, calculate, as the operating time of the robot in the candidate path, a time from a start of a retreat operation that is an operation of moving from a posture of finishing the first task to the candidate retreat posture, to an end of an approach operation that is an operation of moving from the candidate approach posture to a posture of starting the second task.

12. The program generation system according to claim 10, wherein the circuitry is further configured to select a candidate path having a shortest operating time among the plurality of candidate paths as the air-cut path, and select the candidate path corresponding to the air-cut path.

13. The program generation system according to claim 1, wherein the circuitry is further configured to repeatedly execute the operation program virtually on a virtual space while changing the posture of the robot in the connection area among the multiple kinds of candidate postures, and evaluate the operation program.

14. The program generation system according to claim 1, wherein the circuitry is further configured to:
acquire a teaching posture of the robot in the connection area while maintaining the physical location of the tip portion of the robot at the point of intersection connecting the work path with the air-cut path; and
set the multiple kinds of candidate postures within a physical range based on the teaching posture.

15. The program generation system according to claim 14, wherein the circuitry is further configured to:
determine one or more step widths indicating an interval between two adjacent candidate postures; and
add the candidate posture for each given step width based on the teaching posture in order to set the multiple kinds of candidate postures.

16. The program generation system according to claim 14, wherein the circuitry is further configured to add two or more of candidate postures so as to sandwich the teaching posture, in order to set the multiple kinds of candidate postures.

17. The program generation system according to claim 1, wherein the circuitry is further configured to set the multiple kinds of candidate postures rotated along one degree of freedom around a reference axis of the tip portion intersecting with a to-be-processed surface of a workpiece processed by the robot.

18. The program generation system according to claim 1, further comprising:
the robot;
a robot tool comprising the tip portion; and
a robot controller operating the robot based on the generated operation program.

19. A program generation system comprising circuitry configured to:
identify a connection area corresponding to a point of intersection between a first work path of a robot and an air-cut path of the robot, wherein the first work path is a trajectory of a robot tool during a task, and wherein the air-cut path is a trajectory of the robot tool connecting the first work path to a second work path of the robot;
acquire a teaching posture of the robot in the connection area with at least a portion of the robot tool located at the point of intersection;
add two or more candidate postures of the robot so as to sandwich the teaching posture between the two or more candidate postures, in order to set multiple kinds of candidate postures in the connection area;
evaluate an operation program including the first work path and the air-cut path by changing a posture of the robot in the connection area, while the portion of the robot tool is maintained at the point of intersection, among the multiple kinds of candidate postures;
determine one of the multiple kinds of candidate postures as the posture of the robot in the connection area based on an evaluation result in evaluating the operation program; and
generate the operation program.

20. A program generation system comprising circuitry configured to:
identify a connection area corresponding to a point of intersection between a first work path of a robot and an air-cut path of the robot, wherein the first work path is a trajectory of a robot tool during a task, and wherein the air-cut path is a trajectory of the robot tool connecting the first work path to a second work path of the robot;

set a reference axis corresponding to a tip portion of the robot tool that intersects a workpiece surface at the point of intersection between the first work path and the air-cut path;
set multiple kinds of candidate postures of the robot in which the robot tool is rotated about the reference axis with the tip portion intersecting the workpiece surface at the point of intersection;
evaluate an operation program including the first work path and the air-cut path by changing a posture of the robot in the connection area, while the tip portion of the robot tool is maintained at the point of intersection, among the multiple kinds of candidate postures;
determine one of the multiple kinds of candidate postures as the posture of the robot in the connection area based on an evaluation result in evaluating the operation program; and
generate the operation program.

* * * * *